June 13, 1939.  J. A. BUYCK, NOW BY JUDICIAL CHANGE OF NAME J. A. BUICK  2,162,526
REGULATABLE RADIATOR VENTILATION FOR MOTOR VEHICLES
Filed March 3, 1937  2 Sheets-Sheet 1

Inventor:
John Arlon Buick
per Swan Frye and Hardesty
Attorneys.

June 13, 1939.  2,162,526
J. A. BUYCK, NOW BY JUDICIAL CHANGE OF NAME J. A. BUICK
REGULATABLE RADIATOR VENTILATION FOR MOTOR VEHICLES
Filed March 3, 1937    2 Sheets—Sheet 2

Inventor:
John Arlon Buick
per Swan Frye and Hardesty
Attorneys.

Patented June 13, 1939

2,162,526

UNITED STATES PATENT OFFICE 2,162,526

REGULATABLE RADIATOR VENTILATION FOR MOTOR VEHICLES

Jules A. Buyck, Detroit, Mich., now by judicial change of name John Arlon Buick

Application March 3, 1937, Serial No. 128,707

4 Claims. (Cl. 257—132)

This invention relates to an improved construction for the regulatable cooling of motor vehicle radiators, and has for its object an improved organization of parts by means of which the air drawn in through the grille or similar screening at the front of the radiator may be selectively directed to one part of the radiator only, such as the upper part or the lower part to the exclusion of the other according to the temperature conditions to be dealt with, it being a matter of common knowledge that even in the coldest weather the upper portion of a motor vehicle radiator can often be left uncovered with safety, while the lower part needs protection, as by the positioning of a removable cardboard or apron in front thereof. This invention has to do with the direct and regulatable apportionment of the inflowing air between the two parts of the radiator, each served by a separate cold air intake.

At 1 is shown a nearly horizontally positioned fixed baffle plate which divides the cold air intake in front of the radiator proper into two chambers, 2 and 3, the radiator 4 extending vertically behind the total height of the two chambers, and behind the radiator is positioned a closure plate 5, fitted with a circular opening 6 in which is positioned the usual fan 7 for effecting an indrawn movement of the air.

Figure 1:
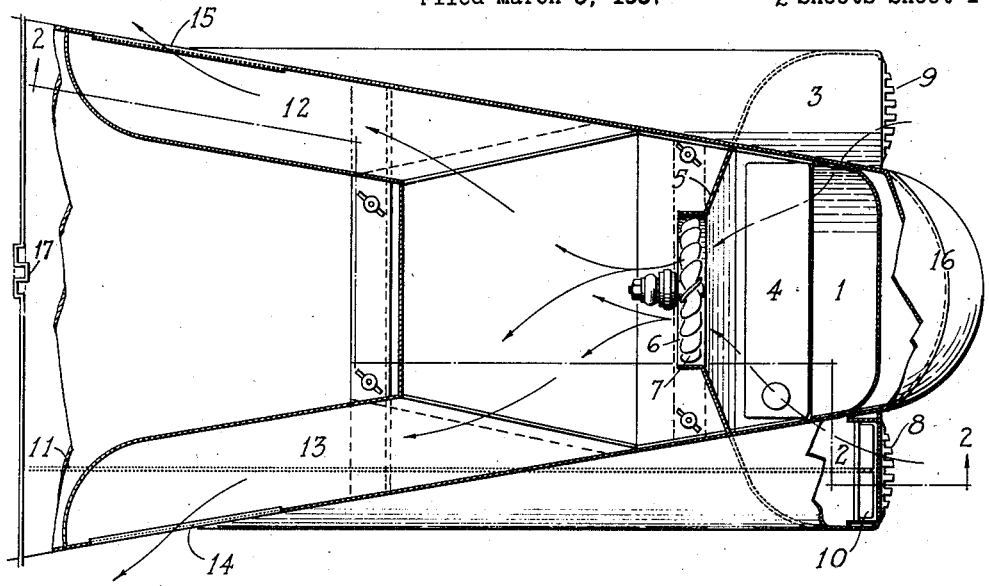
Figure 1 is a plan view from above of my improved construction as applied to a motor vehicle radiator.
Figure 2:
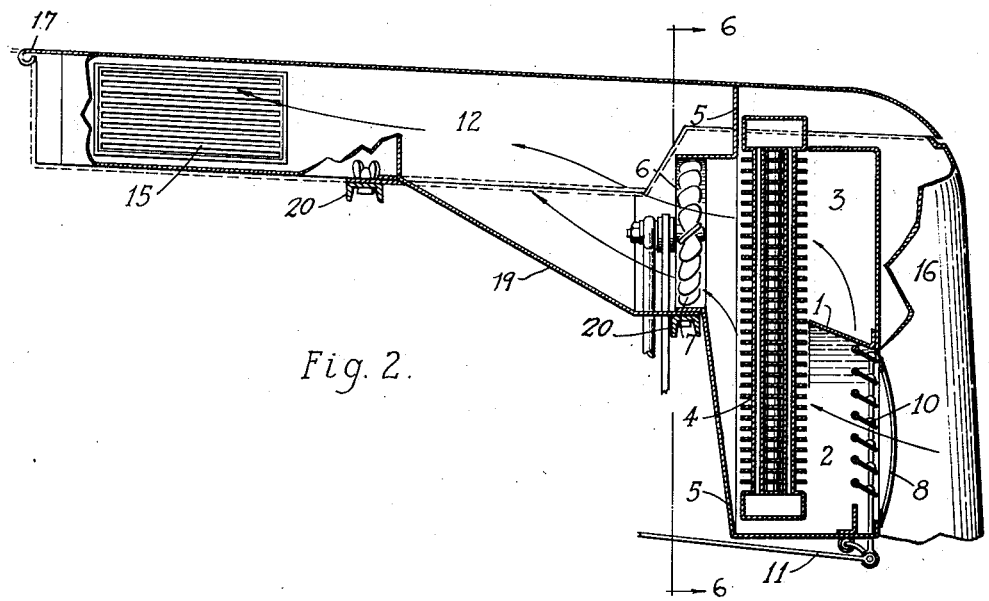
Figure 2 is a side sectional elevational view taken along the irregular line 2—2 of Figure 1 and looking in the direction of the arrows there shown.
Figure 3:
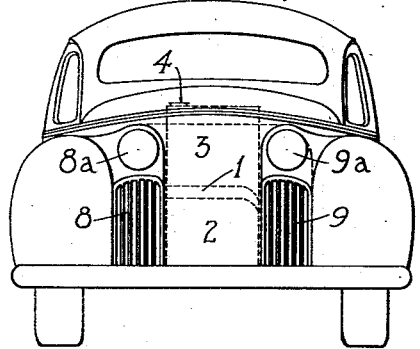
Figure 3 is a front elevational view of a motor vehicle, bringing out the positioning thereon of the cold air intakes.
Figure 4:
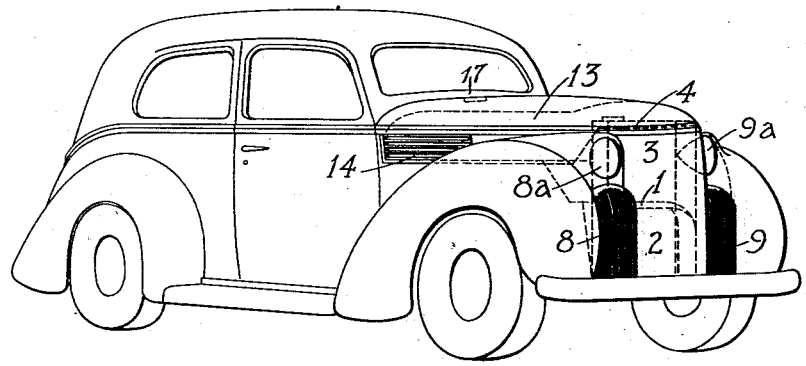
Figure 4 is a perspective of the front or radiator portion of a motor vehicle, taken from a position forwardly and to the right thereof, and further bringing out the preferred positioning of the air intakes and outlet grille.
Figure 6:
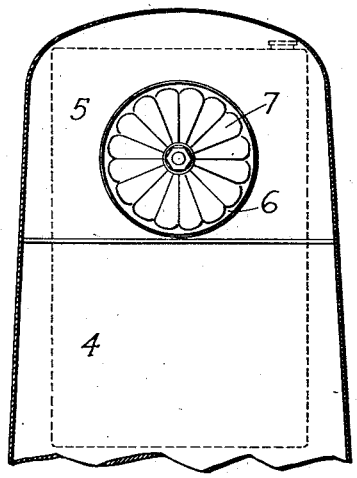
Figure 6 is an elevational view of the positioning of the fan and its surrounding duct walls, taken along the line 6—6 of Figure 2, and looking in the direction of the arrows there shown.
Figure 5:
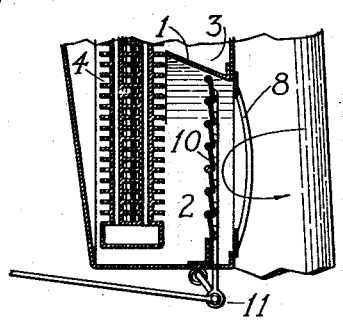
Figure 5 is a fragmentary elevational view quite similar to a portion of Figure 2, but showing the louvers or baffles in closed position.

As brought out in Figures 3 and 4 particularly, my preferred construction involves the provision of two grille protected intakes, 8 and 9, which, for ornamental and constructional reasons may be built in more or less integrally with the head light shells 8ª and 9ª. Of these air inlet apertures the intake 8, which serves the lower portion of the radiator, is fitted with adjusted louvers or baffles 10, which may be closed in severe weather by manually induced draw upon the link 11. The upper part of the radiator shell being exposed to the air entering through the inlet 9 is not protected by any such openable or closeable baffles, in this respect partaking of the treatment often accorded to motor vehicle radiators by positioning a cardboard or apron in front of the lower part of the radiator and leaving the upper half at all times exposed to the entering air, which in the case of the unprotected upper half of the radiator proceeds along the dash-line path through the fan opening 6 into the outlet ducts 12 and 13, and through the openings served by the laterally positioned grilles 14 and 15. The wall 19 subjacently bounding portions of the ducts may, if desired, be a removable piece, held in place by the wing nuts 20. Similarly, if and when the positioning of the baffles or louvers 10 permits the inflow of any air current past the lower part of the radiator it proceeds rearwardly of the vehicle through the ducts 12 and 13 and out past the grille protected openings 14 and 15. This duct arrangement may be omitted and the air discharged directly under the hood. Access to the engine may be had by lifting the hood from the front, about the axis of the hinge 17 as a center.

Since this construction involves the entrance of air only through the grille-covered inlet spaces 8 and 9, it is thus possible to make the front portion 16 of the radiator shell as solid as the side walls, thus protecting the radiator structure from the direct access of air from the front as is now the case with the open grille work which is positioned thereover, as well as contributing to the complete and unbroken appearance of the engine hood as a whole, but having this front portion uniform in appearance with the side and top portions thereof.

It will of course be obvious that the illustrated positioning of the grille-covered air inlet parts 8 and 9 as parts of the headlight stampings is merely for the sake of departing as little as possible from the presently familiar contouring of motor vehicle bodies. But without departure from the spirit of my invention, the positioning of these air inlet openings at any other part of the front of the vehicle structure could be indulged in.

What I claim is:

1. In combination with a motor vehicle radiator and an engine hood housing having an unbroken front wall portion spacedly positioned forwardly of said radiator, a pair of air inlet openings selectively positioned in other portions of the vehicle's sheet metal finishing structure than said engine hood wall, one of which said openings continuingly and unobstructively serves the upper portion of the radiator and the other of which is adapted to guide a cooling air current against the lower portion of the radiator, selectively operable means for temporarily halting the air flow through the second named of said air inlet openings, and outlet passages leading from the vicinity of the radiator to selected points in the hood shell structure relatively remote from the location of the air inlet openings.

2. In combination with a forwardly unbroken engine hood shell of a motor vehicle and a radiator spacedly positioned behind said forward portion of the hood shell, means for selectively guiding a plurality of cooling air streams against the top portion of the radiator and against its bottom portion independently of one another, comprising a pair of forwardly-facing air inlet openings positioned in adjacent though separate portions of the sheet-metal structure of the vehicle body, one of said openings serving the lower portion only of the radiator and the other of said openings serving only the upper portion of the radiator, selectively operable means whereby one of said air inlet openings may be temporarily closed, and discharge outlet conduits leading from the vicinity of the radiator to points in the sheet metal wall of the vehicle surrounding the engine which are relatively remote from the air inlet openings.

3. Means for regulatably guiding a supply of cooling air against the top portion of a motor vehicle radiator and against its bottom portion despite its positioning in spaced relation behind the entirely closed front wall of an engine hood, comprising a pair of air inlet openings positioned in forwardly-facing portions of the vehicle, one serving only the top portion of the radiator and the other serving only the bottom portion thereof, and a manually regulatable shutter mechanism whereby the flow of air through that one of the air inlet openings which serves the bottom portion of the radiator may be temporarily halted.

4. In combination with an engine hood wall having an unbroken forwardly-facing portion and with a radiator spacedly positioned behind such closed forwardly-facing portion, means for providing a flow of cooling air against the top portion of said radiator and against the lower portion thereof independently of one another and regulating the last named flow, comprising a pair of forwardly-facing air inlet openings located in another portion of the vehicle's sheet metal structure than said closed forward hood wall, regulatable means appurtenant that one of said air inlet openings which serves the lower portion of the radiator whereby the flow of cooling air therethrough may be temporarily shut off, and outlet passages leading from the vicinity of the radiator to points in the vehicle structure relatively remote from the air inlet openings.

JULES A. BUYCK.